(12) United States Patent
Lee et al.

(10) Patent No.: US 9,623,517 B2
(45) Date of Patent: Apr. 18, 2017

(54) DEVICE AND METHOD FOR ADHERING DIFFERENT KINDS OF MATERIALS

(71) Applicant: Hyundai Motor Company, Seoul (KR)

(72) Inventors: Hyunwoo Lee, Ulsan (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 14/336,950

(22) Filed: Jul. 21, 2014

(65) Prior Publication Data
US 2015/0144260 A1 May 28, 2015

(30) Foreign Application Priority Data
Nov. 26, 2013 (KR) ........................ 10-2013-0144501

(51) Int. Cl.
*B32B 37/04* (2006.01)
*B23K 26/70* (2014.01)
(Continued)

(52) U.S. Cl.
CPC .......... *B23K 26/703* (2015.10); *B23K 26/037* (2015.10); *B23K 26/22* (2013.01); *B23K 26/32* (2013.01); *B23K 26/323* (2015.10); *B23K 37/0408* (2013.01); *B23K 2203/04* (2013.01); *B23K 2203/05* (2015.10); *B23K 2203/08* (2013.01); *B23K 2203/10* (2013.01); *B23K 2203/16* (2013.01); *B23K 2203/18* (2013.01);
(Continued)

(58) Field of Classification Search
CPC . B32B 37/04; B32B 37/1018; B32B 37/0046; B32B 37/08; B32B 38/0008; B29C 65/16; B23K 26/037; B23K 26/323; B23K 26/703; B23K 26/22; B23K 26/32; B23K 37/0408
See application file for complete search history.

(56) References Cited

U.S. PATENT DOCUMENTS 4,872,940 A * 10/1989 Strum .................... B23K 26/26
156/272.8
2002/0179252 A1* 12/2002 Zuehlke .............. B29C 65/7847
156/379.8

(Continued)

FOREIGN PATENT DOCUMENTS

JP 2006-289437 A 10/2006
JP 2011-143539 A 7/2011
(Continued)

*Primary Examiner* — Daniel McNally
(74) *Attorney, Agent, or Firm* — McDermott Will & Emery LLP

(57) ABSTRACT

A device for adhering different kinds of materials is configured to adhere a metal material and a composite material having an adhering hole. The device includes a frame having first and second free ends that face each other. A laser head is provided at the first free end of the frame and irradiates a laser beam to an adhering point of the metal material. An upper tool moves back and forth at the first free end of the frame and presses the metal material. A lower tool is fixed to the second free end of the frame so as to correspond to the upper tool and supports an adhering point of the composite material. An air suction member is connected to the lower tool to suck air between the lower tool and the adhering hole of the composite material.

6 Claims, 8 Drawing Sheets

(51) Int. Cl.
  *B23K 37/04* (2006.01)
  *B23K 26/22* (2006.01)
  *B23K 26/035* (2014.01)
  *B23K 26/323* (2014.01)
  *B23K 26/32* (2014.01)
  *B29L 31/00* (2006.01)
  *B29C 65/44* (2006.01)
  *B29C 65/74* (2006.01)
  *B29C 65/00* (2006.01)
  *B23K 103/04* (2006.01)
  *B23K 103/16* (2006.01)
  *B23K 103/18* (2006.01)
  *B29L 31/30* (2006.01)
  *B23K 103/08* (2006.01)
  *B23K 103/10* (2006.01)

(52) U.S. Cl.
  CPC .......... *B29C 65/44* (2013.01); *B29C 65/7473* (2013.01); *B29C 66/1122* (2013.01); *B29C 66/41* (2013.01); *B29C 66/721* (2013.01); *B29C 66/7212* (2013.01); *B29C 66/742* (2013.01); *B29C 66/81815* (2013.01); *B29C 66/8322* (2013.01); *B29C 66/845* (2013.01); *B29C 2791/009* (2013.01); *B29L 2031/30* (2013.01); *B29L 2031/737* (2013.01)

(56) References Cited

U.S. PATENT DOCUMENTS

2006/0144509 A1\* 7/2006 Hofmann ............... B23K 26/18
  156/272.8
2013/0220983 A1\* 8/2013 Haschke ................ B23K 26/03
  219/121.81

FOREIGN PATENT DOCUMENTS

| KR | 10-2001-0063694 A | 7/2001 |
| KR | 10-2005-0080118 A | 8/2005 |
| KR | 10-0790776 B1 | 1/2008 |
| KR | 10-2013-0108810 A | 10/2013 |

\* cited by examiner

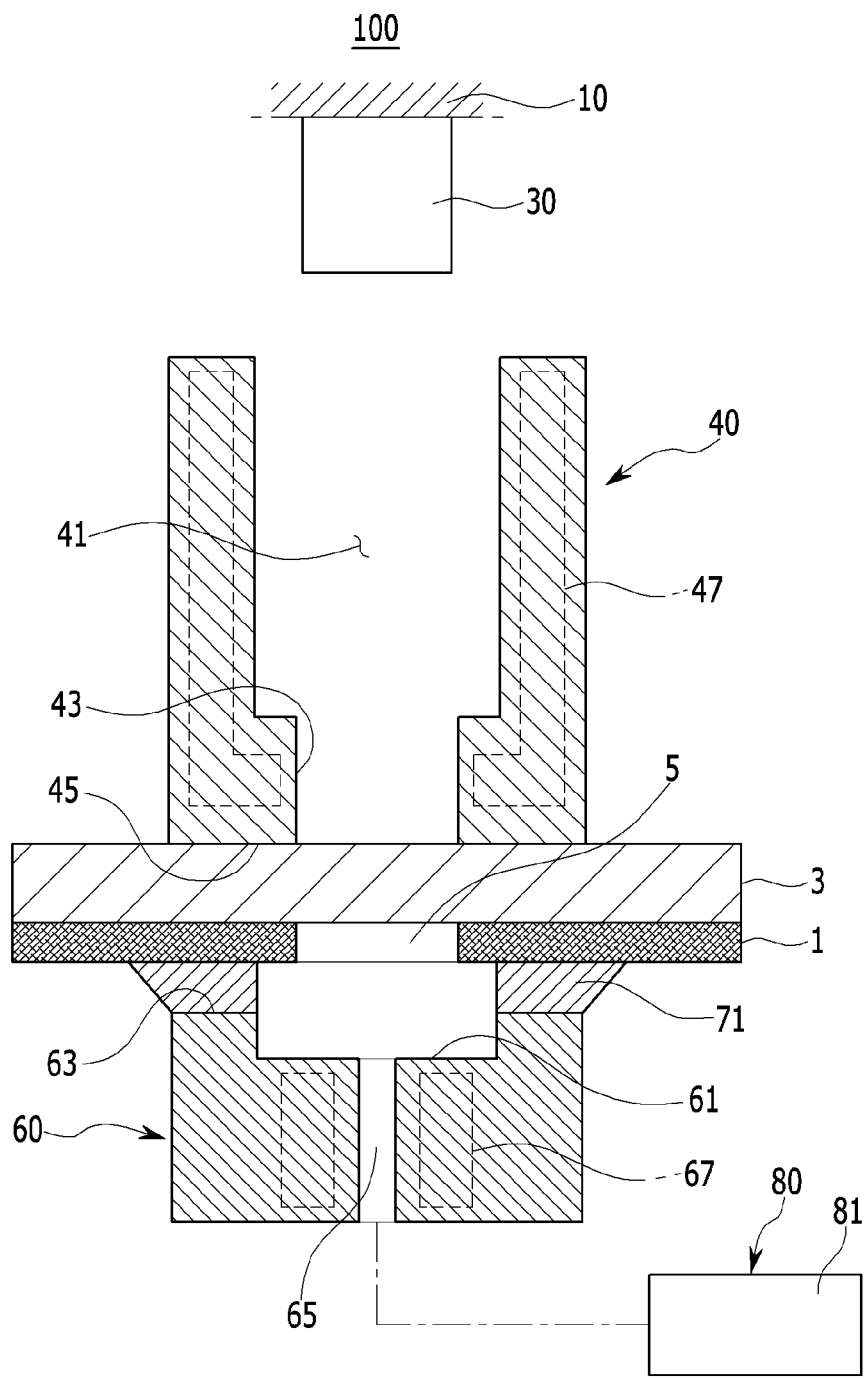

DEVICE AND METHOD FOR ADHERING DIFFERENT KINDS OF MATERIALS

CROSS-REFERENCE TO RELATED APPLICATION

This application claims the benefit of priority to Korean Patent Application No. 10-2013-0144501 filed in the Korean Intellectual Property Office on Nov. 26, 2013, the entire contents of which are incorporated herein by reference.

TECHNICAL FIELD

An exemplary embodiment of the present disclosure relates to a device and a method for adhering different kinds of materials, and more particularly, to a device and a method for adhering different kinds of materials that adhere different kinds of materials of a composite material a metal material.

BACKGROUND

In recent years, a composite material having both strength of metal and light-weight and formability of plastic has been developed. Examples of the composite material may include fiber reinforced plastic (FRP) and carbon fiber reinforced plastic (CFRP).

Such a composite material is a frontier composite material that has been noticed as a light-weight structural material of high strength and high elasticity and uses fiber (carbon fiber) as a reinforcing material, and has an excellent characteristic as the light-weight structural material. Due to the characteristic of the composite material, more products have been manufactured by using a mixture of the composite material and a metal material, and in order to manufacture such products, a method for strongly adhering the metal material and the composite material is important.

Technologies for processing the composite material and forming the products have been actively used, but a method for adhering different kinds of materials such as the composite material and the metal material has been recently developed. As a representative method for adhering different kinds of materials such as the composite material and the metal material, a method for mechanically adhering the composite material and the metal material by using a general rivet, a self-piercing rivet, and a bolt.

However, as compared to a welding method, such an adhering method may have demerits in that manufacturing cost is increased, an appearance quality of an adhering article is degraded, investment cost is increased due to a change of an adhering facility and manufacturing environment caused by changing adhering materials, and a structure of the adhering facility is complicated.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a device and a method for adhering different kinds of materials having advantages of adhering different kinds of materials of a metal material and a composite material by a laser welding method with a simple configuration.

According to an exemplary embodiment of the present disclosure, a device for adhering different kinds of materials that adhere a metal material and a composite material having an adhering hole is provided. The device includes a frame having first and second free ends that face each other. A laser head is provided at the first free end of the frame and irradiates a laser beam to an adhering point of the metal material. An upper tool moves back and forth at the first free end of the frame and presses the metal material. A lower tool is fixed to the second free end of the frame to correspond to the upper tool and supports an adhering point of the composite material. An air suction member is connected to the lower tool to suck air between the lower tool and the adhering hole of the composite material.

The frame may be attached to or detached from an arm of a robot through a fixing bracket.

The frame may be a C-type frame and may be provided at the fixing bracket.

The laser head may be provided at the fixing bracket so as to correspond to the upper tool.

At least one operation cylinder for moving the upper tool back and forth may be provided at the fixing bracket. The operation cylinder may include an operation rod, and the operation rod may be connected to the upper tool.

A laser-beam irradiation path through which the laser beam passes may be formed inside the upper tool, and a pressing end for pressing the adhering point of the metal material may be formed at the upper tool.

A first cooling-water circulating path that circulates cooling water may be formed at the upper tool.

An air exhaust path that exhausts air may be formed inside the lower tool, and a supporting end for supporting the adhering point of the composite material may be formed at the lower tool.

A second cooling-water circulating path that circulates cooling water may be formed at the lower tool.

A sealing member that blocks a gap between the supporting end and the composite material may be formed at the supporting end of the lower tool.

The air suction member may include a vacuum pump connected to the air exhaust path.

According to another exemplary embodiment of the present disclosure, a method for adhering different kinds of materials includes providing the metal material and the composite material having the adhering hole formed at the adhering point. The composite material and the metal material that are overlapped with each other at the lower tool are positioned to support the adhering point of the composite material through the lower tool. The upper tool moves forwards to press the adhering point of the metal material. The laser beam irradiates through the laser head to the adhering point of the metal material to form a melted portion. Air is sucked through the lower tool to introduce the melted portion into the adhering hole of the composite material. The melted portion is cooled through the lower tool, and the composite material and the metal material adhere to each other by using the melted portion.

In the step of irradiating, cooling water may be circulated into the upper tool to cool a region around the melted portion at the adhering point of the metal material.

In the step of cooling, cooling water may be circulated into the lower tool to cool the melted portion.

In the step of sucking, a filler metal may fill into a base-material loss portion of the adhering point of the metal material.

In the step of cooling, the melted portion may be cooled and contracted to allow the composite material and the metal material to be combined.

Carbon fiber reinforced plastic (CFRP) may be used as the composite material.

According to an exemplary embodiment of the present disclosure, it is possible to integrally combine different kinds of materials of the composite material and the metal material by a contraction force generated by cooling the melted portion by forming the melted portion at the adhering point of the metal material by a laser welding method and introducing the melted portion into the adhering hole of the composite material by the air suction pressure.

Accordingly, in the exemplary embodiment of the present disclosure, it is possible to adhere the different kinds of materials of the composite material and the metal material while minimizing a change of an adhering facility and manufacturing environment without using a separate medium such as a rivet or a bolt.

By doing this, in the exemplary embodiment of the present disclosure, as compared to a riveting adhering method of the related art, it is possible to reduce manufacturing cost and to achieve an excellent appearance quality of an adhering article. Further, it is possible to reduce investment cost for an adhering facility and manufacturing environment caused by changing the adhering materials and to simplify a structure of the adhering facility.

BRIEF DESCRIPTION OF THE DRAWINGS

These drawings are presented to describe exemplary embodiments of the present disclosure, and thus, the technical spirit of the present disclosure should not be interpreted as being limited to the accompanying drawings.

FIG. 2 is a schematic cross-sectional view of the device for adhering different kinds of materials according to an exemplary embodiment of the present disclosure.

DETAILED DESCRIPTION

Figure 1:
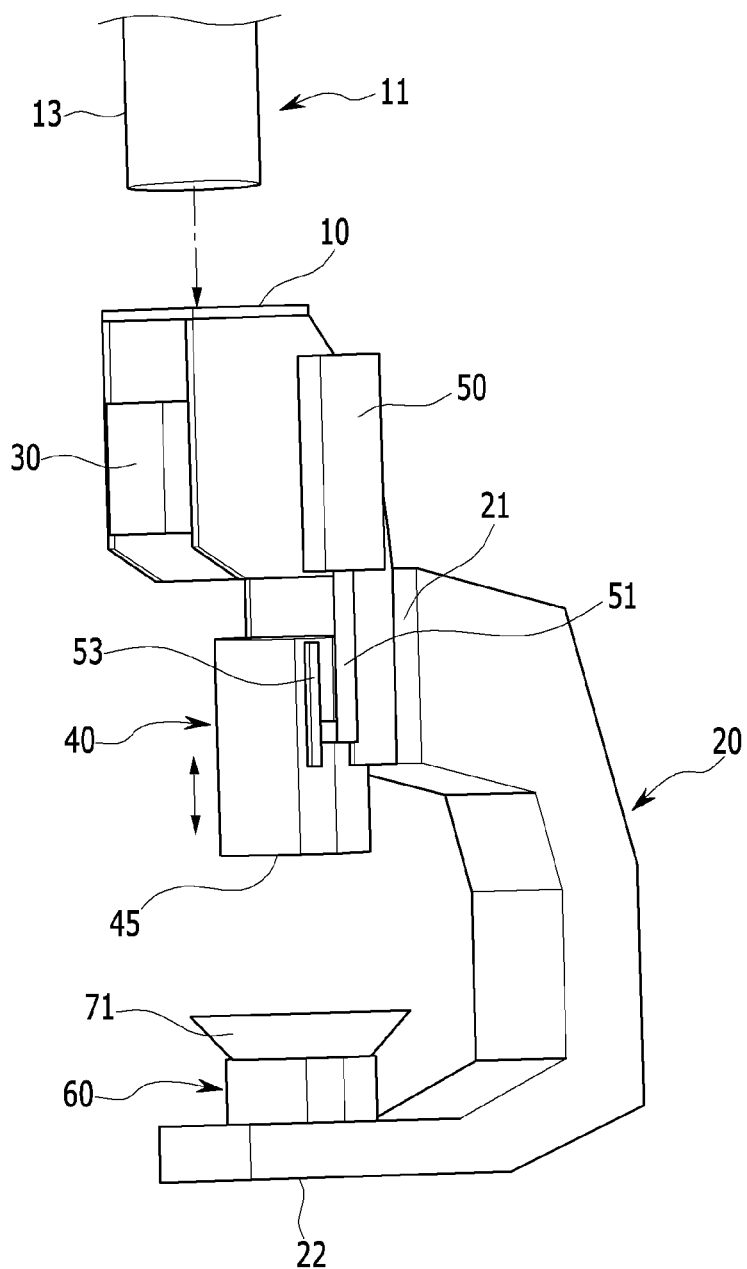
FIG. 1 is a perspective view of a device for adhering different kinds of materials according to an exemplary embodiment of the present disclosure.

The present disclosure will be described more fully hereinafter with reference to the accompanying drawings, in which exemplary embodiments of the disclosure are illustrated. As those skilled in the art would realize, the described embodiments may be modified in various different ways, all without departing from the spirit or scope of the present disclosure.

Unrelated parts will be omitted to clearly describe the present disclosure, and throughout the specification, the same or similar constituent elements will be assigned the same reference numeral. In the drawings, sizes and thicknesses of components are arbitrarily illustrated for the convenience in description, and thus, the present disclosure is not necessarily limited to the drawings. The thicknesses thereof are thickly illustrated to clarify various portions and regions. Further, in the following detailed description, the terms 'first,' 'second,' etc. given to components having the same configuration are only used to distinguish one component from another, and the terms do not necessarily denote any order in the following detailed description.

Throughout the specification, unless explicitly described to the contrary, the word "comprise" and variations such as "comprises" or "comprising", will be understood to imply the inclusion of stated elements but not the exclusion of any other elements. Furthermore, the terms " . . . unit," " . . . means," " . . . part," "member," etc. described in the specification means a unit having a comprehensive configuration so as to perform at least one function or operation.

FIG. 1 is a perspective view of a device for adhering different kinds of materials according to an exemplary embodiment of the present disclosure, and FIG. 2 is a schematic cross-sectional view of a device for adhering different kinds of materials according to an exemplary embodiment of the present disclosure. Referring to FIGS. 1 and 2, a device 100 for adhering different kinds of materials according to an exemplary embodiment of the present disclosure may be applied to a vehicle-body component assembly process of assembling vehicle-body assembling components such as vehicle-body panels.

In order to reduce a weight of a vehicle-body panel in the vehicle-body component assembly process, the device 100 for adhering different kinds of materials according to an exemplary embodiment of the present disclosure is configured to integrally adhere the different kinds of materials of a composite material 1 and a metal material 3. For example, the composite material 1 may include fiber reinforced plastic (FRP) and carbon fiber reinforced plastic (CFRP).

The composite material 1 is a frontier composite material that has been noticed as a light-weight structural material of high strength and high elasticity and uses fiber as a reinforcing material, and has an excellent characteristic as a light-weight structural material. Further, since the composite material 1 has a high strength, an elastic modulus and cyclic fatigue are more excellent than those of a steel material and also has a thermal expansion coefficient lower than that of the steel material. The composite material has a characteristic in which dimensional stability, electrical conductivity, corrosion resistance, and vibration damping performance are excellent. Here, the composite material 1 may be produced by layering a plurality of material layers in which resin such as epoxy resin is immersed in a (carbon) fiber material and then hardening the resin.

The metal material 3 may include a general steel plate, stainless steel, an aluminum material, and a non-ferrous alloy material. Furthermore, an adhering hole 5 is formed in an adhering point of the composite material 1 where the composite material 1 and the metal material 3 adhere to each other.

The following constituent elements when the adhering device 100 stands in an up and down direction as illustrated in the drawing will be described, and a back and forth direction may be defined as the up and down direction. Moreover, in an exemplary embodiment of the present disclosure, it has been described that the composite material 1 and the metal material 3 integrally adhere to each other while the metal material 3 is layered on a top surface of the composite material 1. However, the definition of the direction is merely a relative term, and since the direction may change depending on an adhering direction and a reference position of the adhering device 100, the reference direction is not necessarily limited to the reference direction of the present exemplary embodiment.

The device 100 for adhering different kinds of materials according to an exemplary embodiment of the present disclosure has a structure in which the different kinds of materials of the composite material 1 and the metal material 3 can adhere to each other while minimizing a change of a facility and a manufacturing environment without using a separate medium such as a rivet or a bolt. To achieve this, the device 100 for adhering different kinds of materials according to the exemplary embodiment of the present disclosure basically includes a fixing bracket 10, a frame 20, a laser head 30, an upper tool 40, a lower tool 60, and an air suction member 80.

The fixing bracket 10 is attached to or detached from an arm 13 of a robot 11, and a tool changer (not illustrated) having a typical structure is provided at the fixing bracket 10 so as to be attached to or detached from a front end of the arm 13 of the robot 11. That is, in an exemplary embodiment of the present disclosure, the fixing bracket 10 may move at a multi-axis direction as a multi-axis motion of the arm 13 through teaching control of the robot 11.

Alternatively, the device 100 for adhering different kinds of materials according to an exemplary embodiment of the present disclosure is not necessary limited to being attached to the arm 13 of the robot 11 through the fixing bracket 10, and the device may be provided to be fixed to a separate supporting frame. Various constituent elements to be described below may be attached to the fixing bracket 10. The fixing bracket 10 is configured to support the constituent elements, and includes parts such as various blocks, plates, housings, covers, and collars. However, since the parts are configured to provide the constituent elements to the fixing bracket 10, in an exemplary embodiment of the present disclosure, the parts are commonly called the fixing bracket 10 except where otherwise stated.

The frame 20 is provided at the fixing bracket 10. The frame 20 may be moved to various positions along with the movement of the robot 11 while being attached to the arm 13 of the robot 11 through the fixing bracket 10 and may be rotated at a predetermined angle by the arm 13 of the robot 11. The frame 20 is a C-shaped frame having a first free end 21 and a second free end 22 that face each other, and is typically referred to as a "C-frame" or "C-type frame" in the art.

The laser head 30 is configured to irradiate a laser beam that is generated through a laser generator (not illustrated) to an adhering point of the metal material 3. The laser head may be provided to be fixed to the fixing bracket 10 at a position close to the first free end 21 of the frame 20 so as to correspond to the upper tool 40 to be described below. That is, the laser head 30 irradiates the laser beam to the adhering point of the metal material 3 to melt a portion corresponding to the adhering hole 5 of the composite material 1.

Here, the laser head 30 does not completely melt the melted portion of the adhering point of the metal material 3, and can irradiate the laser beam capable of melting the material to a glass transition temperature, for example, about 600 to 650° C. in the case of steel. The laser head 30 is a known welding laser head that is widely used in the art, and thus, a more detailed description thereof will not be presented in the present specification.

The upper tool 40 is configured to press a top surface of the metal material 3 overlapped with the composite material 1, and is provided at the first free end 21 of the frame 20 so as to correspond to the laser head 30 to move back and forth in the up and down direction. The upper tool 40 has a hollow shape in which upper and lower ends thereof are open, and a laser-beam irradiation path 41 through which the laser beam passes is formed inside the hollow portion. To achieve this, a penetration hole 43 through which the laser beam passes is formed at a lower end of the upper tool 40. The penetration hole 43 has a diameter smaller than the upper opening of the upper tool 40, and the lower end of the upper tool 40 may be formed as a pressing end 45 that presses the top surface of the metal material 3. Further, a first cooling-water circulating path 47 for circulating cooling water supplied through a separate cooling-water supplier (not illustrated) is formed inside the upper tool 40.

The upper tool 40 may be provided so as to move back and forth in the up and down direction by an operation cylinder 50. The operation cylinder 50 is provided to be fixed to the fixing bracket 10 so as to correspond to the upper tool 40. The operation cylinder 50 moves back and forth by an air pressure or a hydraulic pressure, and includes an operation rod 51 that moves the upper tool 40 in the up and down direction. The operation rod 51 may be connected to the upper tool 40 through a connection bracket 53.

The lower tool 60 is configured to support the adhering point of the composite material 1 overlapped with the metal material 3 and may be fixed to the second free end 22 of the frame 20 so as to correspond to the upper tool 40.

A groove 61 connected to the adhering hole 5 of the composite material 1 is formed at the top surface of the lower tool 60 that supports the adhering point of the composite material 1. The groove 61 may have a diameter larger than the adhering hole 5, and may be formed as a groove on a top surface of the lower tool 60. At the top surface of the lower tool 60, a supporting surface is formed at an edge of the groove 61, and the supporting surface may be formed as a supporting end 63 that supports the adhering point of the composite material 1.

Further, an air exhaust path 65 for exhausting air between the groove 61 and the adhering hole 5 of the composite material 1 to the outside is formed inside the lower tool 60. The air exhaust path 65 is formed to penetrate a center of a bottom surface of the lower tool 60 from a center of a bottom surface of the groove 61. Furthermore, a second cooling-water circulating path 67 for circulating cooling water supplied through the separate cooling-water supplier (not illustrated) is formed inside the lower tool 60.

In addition, a sealing member 71 as an air cap that blocks a gap between the composite material 1 and the supporting end 63 is formed at the supporting end 63 of the lower tool 60. The sealing member 71 is configured to prevent the air between the groove 61 and the adhering hole 5 of the composite material 1 from leaking into between the supporting end 63 and the composite material 1, and may be made of various materials such as a metal material and a heat-resisting rubber.

An air suction member 80 is configured to suck the air between the groove 61 and the adhering hole 5 of the composite material 1 through the air exhaust path 65 of the lower tool 60, and includes a vacuum pump 81 connected to the air exhaust path 65 of the lower tool 60. The vacuum pump 81 is an air suction pump that is widely known in the art, and thus, a more detailed description thereof will not be presented in the present specification.

Hereinafter, an operation of the device 100 for adhering different kinds of materials according to an exemplary embodiment of the present disclosure having the aforementioned configuration and a method for adhering different kinds of materials by using the adhering device 100 will be described in detail with reference to the previously described drawings and the accompanying drawings.

Figure 3A:
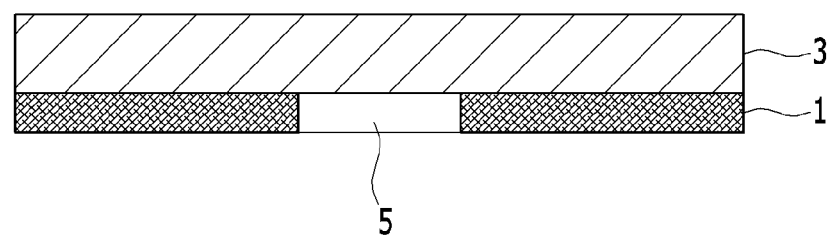
FIGS. 3A to 3F are diagrams for describing an operation of the device for adhering different kinds of materials according to an exemplary embodiment of the present disclosure and a method for adhering different kinds of materials.

FIGS. 3A to 3F are diagrams for describing an operation of the device 100 for adhering different kinds of materials according to an exemplary embodiment of the present disclosure and a method for adhering the different kinds of materials. Referring to FIG. 3A, in an exemplary embodiment of the present disclosure, the metal material 3 such as a steel plate, stainless steel, an aluminum material, or a non-ferrous alloy material that can be used as a vehicle-body panel is first prepared.

Further, in an exemplary embodiment of the present disclosure, a composite material 1 such as carbon fiber reinforced plastic (CFRP) is prepared, and the adhering hole 5 is formed in the adhering point where the composite material and the metal material 3 adhere.

Figure 3B:
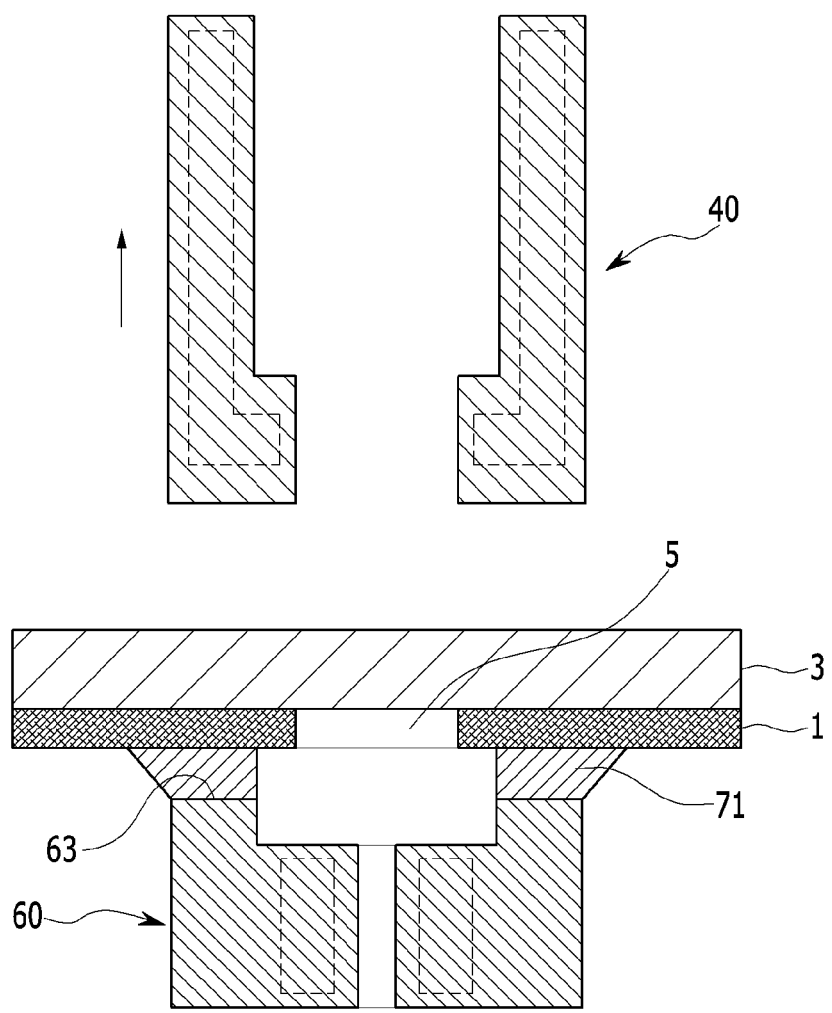

Subsequently, as illustrated in FIG. 3B, the composite material 1 and the metal material 3 that are overlapped with each other are positioned at the supporting end 63 of the lower tool 60. Thus, the lower tool 60 can support the adhering point of the composite material 1 through the supporting end 63. That is, the supporting end 63 of the lower tool 60 can support the adhering point of the composite material 1 through the sealing member 71. Here, the upper tool 40 has been already moved upwards by a backward operation of the operation rod 51 of the operation cylinder 50 so as to be separated from the top surface of the metal material 3 at a certain distance.

Figure 3C:
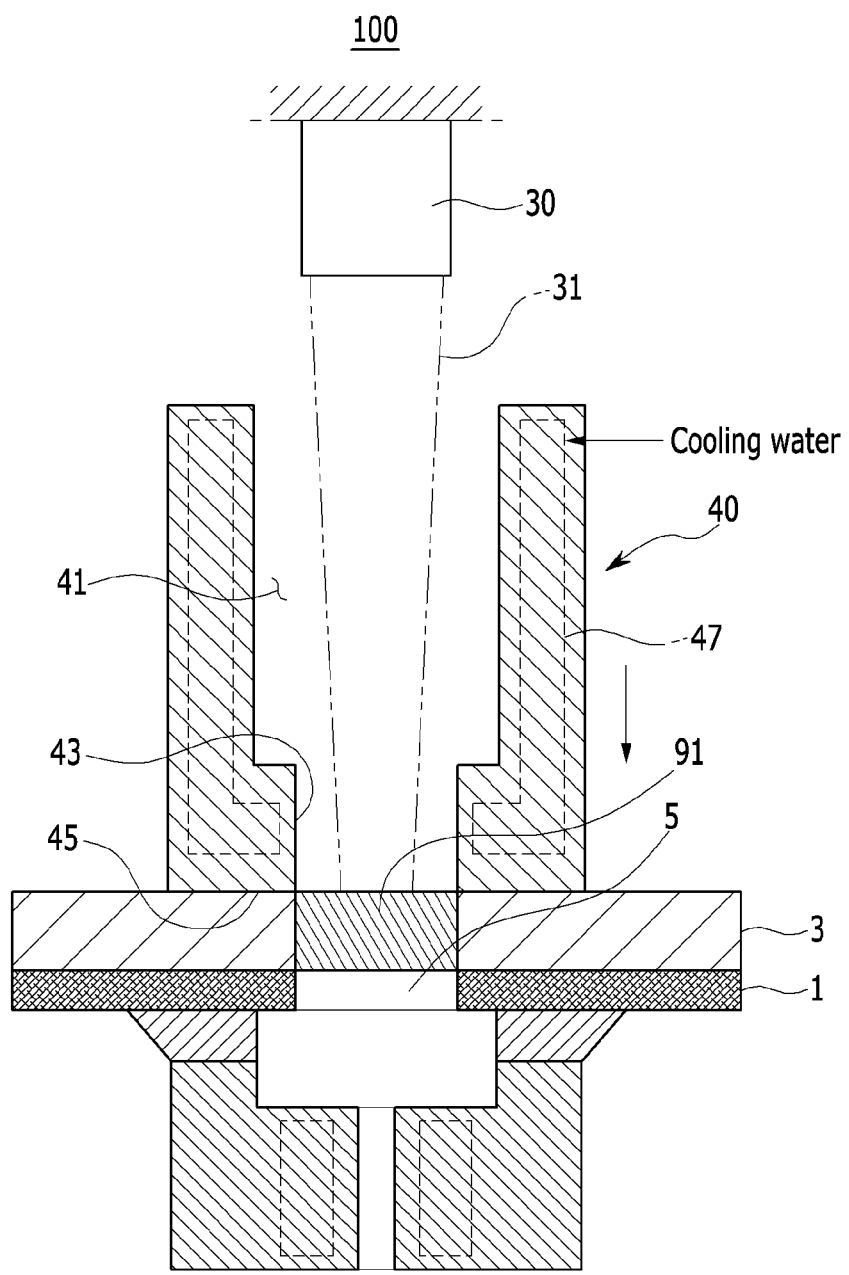

In such a state, in an exemplary embodiment of the present disclosure, the upper tool 40 is moved downwards by a forward operation of the operation rod 51 of the operation cylinder 50, as illustrated in FIG. 3C. Thus, the upper tool 40 is lowered toward the adhering point of the metal material 3 by the operation cylinder 50 to press the adhering point of the metal material 3 through the pressing end 45 at a certain pressure.

In this state, in an exemplary embodiment of the present disclosure, the laser beam 31 is irradiated to the adhering point of the metal material 3 through the laser head 30. At this time, the laser beam 31 is irradiated to the adhering point of the metal material 3 through the laser-beam irradiation path 41 of the upper tool 40, and may be irradiated to the adhering point of the metal material 3 through the penetration hole 43 along the laser-beam irradiation path 41. Thus, a melted portion 91 melted by the laser beam 31 is formed at the adhering point of the metal material 3. Here, the melted portion 91 is completely melted by the laser beam 31 so as not to flow, and may be melted to a glass transition temperature (for example, about 600 to 650° C. in the case of steel).

In the above-stated process, the cooling water is circulated into the first cooling-water circulating path 47 of the upper tool 40 to cool a region around the melted portion 91 at the adhering point of the metal material 3. By doing this, heat of the melted portion 91 is prevented from being transferred to the region around the adhering point.

Figure 3D:
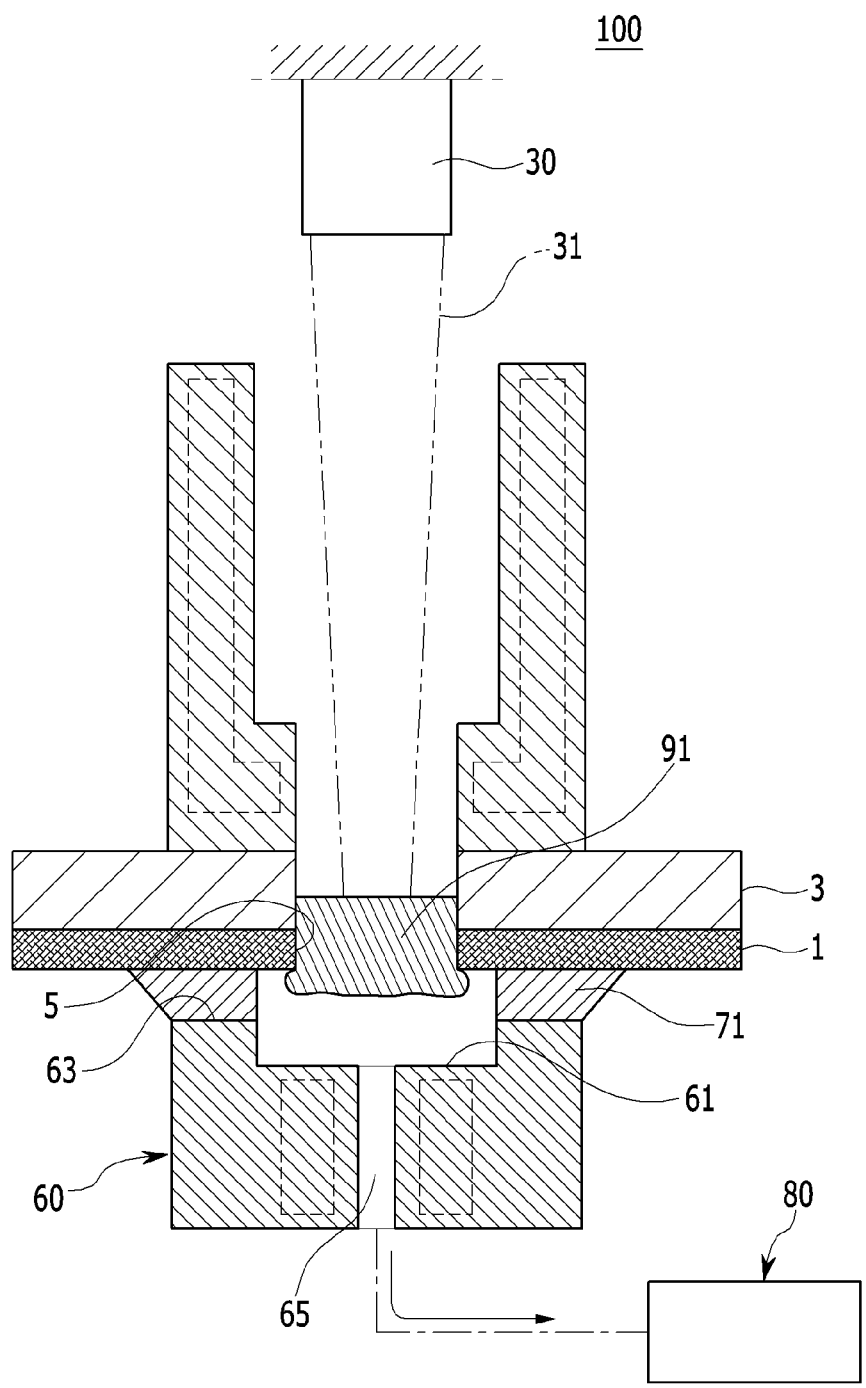

Thereafter, the air suction member 80 is operated as illustrated in FIG. 3D, and the air between the groove 61 of the lower tool 60 and the adhering hole 5 of the composite material 1 is sucked through the air exhaust path 65 of the lower tool 60. Here, since the sealing member 71 is provided at the supporting end 63 of the lower tool 60, the air between the groove 61 and the adhering hole 5 of the composite material 1 can be prevented from leaking into between the supporting end 63 and the composite material 1. Thus, the melted portion 91 is introduced into the adhering hole 5 of the composite material 1 by an air suction pressure through the air exhaust path 65. At this time, the melted portion 91 can be introduced toward the groove 61 of the lower tool 60 through the adhering hole 5.

Figure 3E:
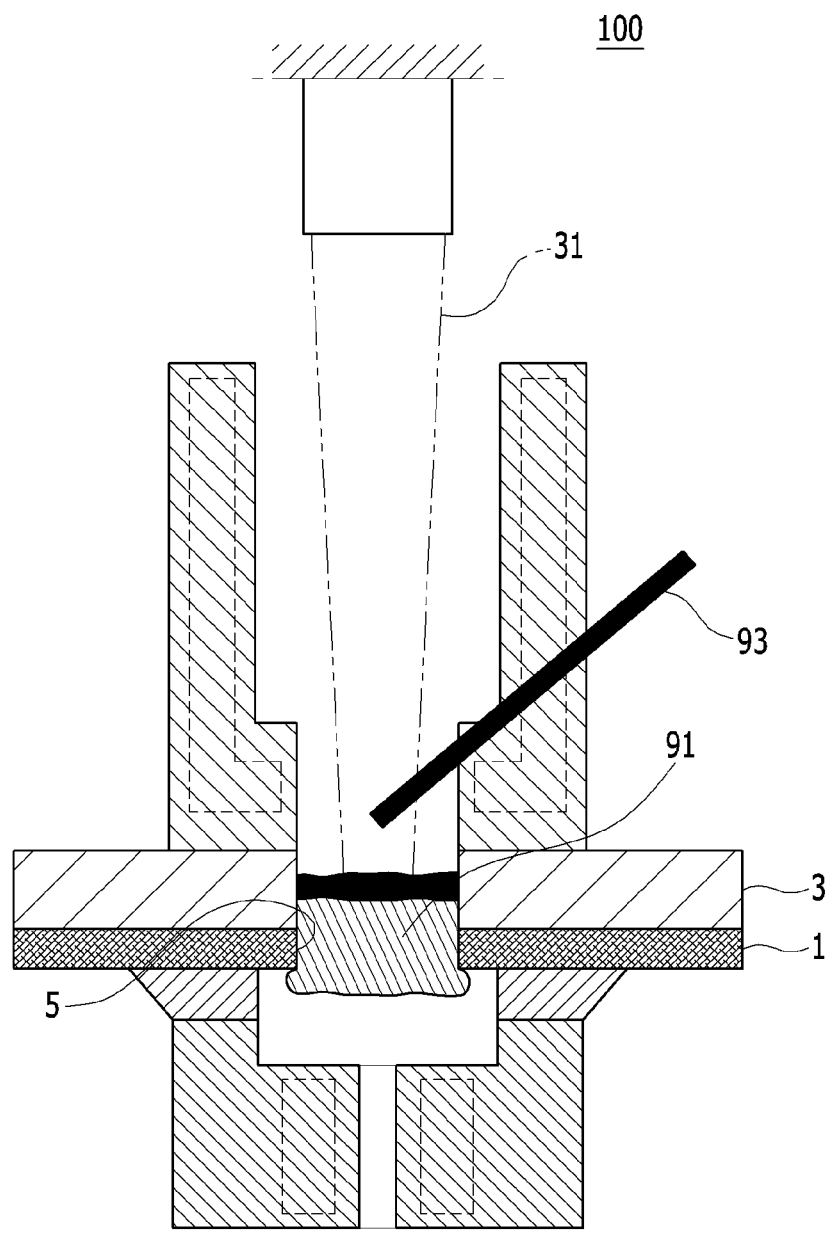

In the above-stated process, in an exemplary embodiment of the present disclosure, a filler metal 93 fills into a base-material loss portion (a hole of the melted portion) of the adhering point of the metal material 3 formed by introducing the melted portion 91 into the adhering hole 5 of the composite material 1, as illustrated in FIG. 3E. The filler metal 93 is melted by the laser beam 31 to fill into the base-material loss portion of the adhering point of the metal material 3.

Figure 3F:
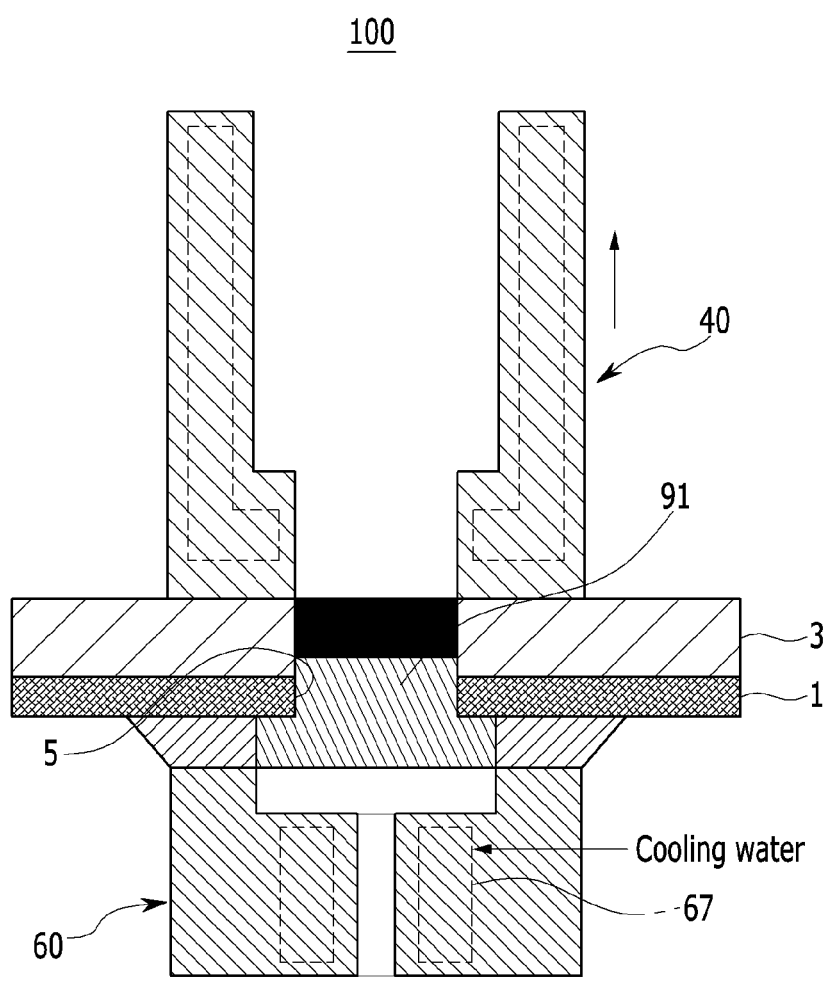

As described above, in an exemplary embodiment of the present disclosure, while the filler metal 93 fills into the base-material loss portion of the adhering point of the metal material 3, the irradiation of the laser beam 31 of the laser head 30 (see FIG. 3E) is stopped as illustrated in FIG. 3F. The cooling water is circulated into the second cooling-water circulating path 67 of the lower tool 60 to cool the melted portion 91 introduced into the adhering hole 5 of the composite material 1. Thus, in an exemplary embodiment of the present disclosure, the melted portion 91 introduced into the adhering hole 5 of the composite material 1 is cooled and contracted by the cooling water circulated into the second cooling-water circulating path 67 of the lower tool 60, so that the adhering points of the composite material 1 and the metal material 3 can be integrally combined by a strong combining force through the melted portion 91.

When the upper tool 40 is moved upwards by the backward operation of the operation cylinder 50, the process of adhering different kinds of materials of the composite material 1 and the metal material 3 according to an exemplary embodiment of the present disclosure is finished.

As described above, in accordance with the device 100 and the method for adhering different kinds of materials according to an exemplary embodiment of the present disclosure, it is possible to integrally combine different kinds of materials of the composite material 1 and the metal material 3 by a contraction force generated when cooling the melted portion 91 by forming the melted portion 91 at the adhering point of the metal material 3 using a laser welding method and introducing the melted portion 91 into the adhering hole 5 of the composite material 1 by the air suction pressure.

Accordingly, in the exemplary embodiment of the present disclosure, it is possible to adhere the different kinds of materials of the composite material 1 and the metal material 3 by the strong combining force while minimizing a change of an adhering facility and manufacturing environment without using a separate medium such as a rivet or a bolt.

By doing this, in the exemplary embodiment of the present disclosure, as compared to a riveting adhering method of the related art, it is possible to reduce manufacturing cost and to achieve an excellent appearance quality of an adhering article. Further, it is possible to reduce investment cost for the adhering facility and manufacturing environment caused by changing the adhering materials and to simplify a structure of the adhering facility.

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A method for adhering different kinds of materials by using a device for adhering different kinds of materials that adheres a metal material and a composite material having an adhering hole, wherein the device comprises: a frame having first and second free ends that face each other; a laser head that is provided at the first free end of the frame and irradiates a laser beam to an adhering point of the metal material so as to form a melted portion of the metal material; an upper tool that is provided to move back and forth at the first free end of the frame and presses the metal material; a lower tool that is provided to be fixed to the second free end of the frame so as to correspond to the upper tool and supports an adhering point of the composite material; and an air suction member that is connected to the lower tool to suck air between the lower tool and the adhering hole of the composite material such that the melted portion is introduced to the adhering hole, when cooled, to produce a contraction force that combines the metal material and the composite material, the method comprising:
   (a) providing the metal material and the composite material having the adhering hole formed at the adhering point;
   (b) positioning the composite material and the metal material that are overlapped with each other at the lower tool to support the adhering point of the composite material through the lower tool;
   (c) moving the upper tool forwards to press the adhering point of the metal material;
   (d) irradiating the laser beam through the laser head to the adhering point of the metal material to form the melted portion;
   (e) sucking air through the lower tool to introduce the melted portion into the adhering hole of the composite material; and
   (f) cooling the melted portion through the lower tool and adhering the composite material and the metal material to each other by using the melted portion.

2. The method for adhering different kinds of materials of claim 1, wherein:
   in step (d),
   the cooling water is circulated into the upper tool to cool a region around the melted portion at the adhering point of the metal material.

3. The method for adhering different kinds of materials of claim 1, wherein:
   in step (f),
   the cooling water is circulated into the lower tool to cool the melted portion.

4. The method for adhering different kinds of materials of claim 1, wherein:
   in step (e),
   a filler metal fills into a base-material loss portion of the adhering point of the metal material.

5. The method for adhering different kinds of materials of claim 1, wherein:
   in step (f),
   the melted portion is cooled and contracted to allow the composite material and the metal material to be combined.

6. The method for adhering different kinds of materials of claim 1, wherein:
   carbon fiber reinforced plastic (CFRP) is used as the composite material.

* * * * *